UNITED STATES PATENT OFFICE.

CLARENCE B. SPRAGUE, OF SALT LAKE CITY, UTAH, ASSIGNOR TO UNITED STATES SMELTING, REFINING & MINING COMPANY, OF PORTLAND, MAINE, A CORPORATION OF MAINE.

METHOD OF MAKING LEAD ARSENIATE.

1,064,023.      Specification of Letters Patent.      Patented June 10, 1913.

No Drawing.      Application filed November 11, 1909. Serial No. 527,535.

*To all whom it may concern:*

Be it known that I, CLARENCE B. SPRAGUE, a citizen of the United States, residing at Salt Lake City, in the county of Salt Lake and State of Utah, have invented certain new and useful Improvements in Methods of Making Lead Arseniate; and I do hereby declare the following to be a full, clear, and exact description of the invention, such as will enable others skilled in the art to which it appertains to make and use the same.

The present invention relates to an improved method of making lead arseniate.

Lead arseniate is in extensive and growing use as an exterminator of insects destructive to plant life.

In the wet way, it has been manufactured by a variety of methods, such as by the oxidation of arsenious acid to arsenic acid by means of nitric acid, and the addition of lead acetate to the solution, whereby lead arseniate is precipitated.

Another process depends on the precipitation of lead arseniate when a solution of lead acetate is added to a solution of sodium arseniate.

In these methods the arsenious acid, or sodium arseniate, and the lead acetate used, must first be prepared as preliminary parts of such processes, and add greatly to their cost.

The present invention differs from other methods in use, in that the lead arseniate is produced in the dry way, directly from the union of its elements, on the roasting of materials containing lead and arsenic in intimate association, in presence of air; and in the recovery of the lead arseniate so produced (which may be in admixture with other substances) which consists in dissolving it in a solution of an alkali hydrate and afterward precipitating it by neutralizing the alkali with an acid.

I have discovered that on properly roasting materials containing lead and arsenic in presence of air, a reaction takes place resulting in the formation of lead arseniate. The arsenic and lead need not be present in the proportions in which they combine. If there is present an excess of arsenic over that amount capable of uniting with the lead, this excess is expelled more or less completely as arsenious acid. If there is present an excess of lead, this is left in the roast as oxid or in some other form. If, in the material to be roasted, the lead and arsenic are present in the proper proportions, practically the whole of these may be obtained as lead arseniate. I have also discovered that the lead arseniate so produced is soluble in solutions of sodium and potassium hydrates; and that upon neutralizing the alkali with acetic or nitric acid, the whole of the lead arseniate is precipitated from its solution.

Broadly stated, the process consists in the roasting of materials containing lead and arsenic, in presence of air with the formation of lead arseniate; the dissolving of the lead arseniate so produced in a solution of caustic soda or potash; and, after filtration from any residue, the precipitation of the lead arseniate by neutralization of the alkali with acetic or nitric acid.

One specific application of the process contemplates the manufacture of lead arseniate from speiss and litharge; the former being an arsenic bearing material resulting from furnace operations, and the latter oxid of lead. For the purpose of making lead arseniate, the speiss is ground to a suitable fineness, and intimately mixed with the requisite amount of litharge. For each pound of arsenic in the speiss 4.4 lbs. of litharge are used, and about 6 lbs. of lead arseniate are produced.

The roasting is conducted with access of air at a moderate red heat in a furnace of suitable construction, such as an ordinary reverberatory roaster, until the oxidation is complete. This may require, according to circumstances, 6 to 10 hours. The roast is next conveyed to leaching kettles and extracted with a hot strong solution of caustic soda, say one containing 25 to 30 per cent. sodium hydrate. About 1.5 lbs. of caustic soda are used per pound of lead arseniate present. After leaching out the lead arseniate the solution is filtered from the insoluble residue and the alkali is neutralized with acetic or nitric acid. This results in the precipitation of the lead arseniate which is filtered and washed and is now ready for use. About 1.5 lbs. of acid are used for each pound of caustic soda present in the solution. The acid may be regenerated by any appropriate method.

Having thus described the invention what is claimed is:

The method of making lead arseniate which consists in roasting at a moderate red heat with access of air materials containing lead and arsenic, dissolving the lead arseniate in a solution of caustic alkali, and precipitating the lead arseniate from the solution by neutralization, substantially as described.

CLARENCE B. SPRAGUE.

Witnesses:
R. H. BUTTERFIELD,
JESSIE E. ALLEY.